United States Patent
Wilson

(10) Patent No.: US 6,560,718 B1
(45) Date of Patent: May 6, 2003

(54) DISK DRIVE ERROR RECOVERY AND DEFECT MANAGEMENT METHOD

(75) Inventor: Aaron Wade Wilson, Berthoud, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/451,483

(22) Filed: Nov. 30, 1999

(51) Int. Cl.⁷ .............................. G06F 11/00
(52) U.S. Cl. .............................. 714/5; 714/8
(58) Field of Search ............... 714/35, 5, 8, 42; 711/201

(56) References Cited

U.S. PATENT DOCUMENTS

| | | | |
|---|---|---|---|
| 3,771,143 A | * 11/1973 | Taylor | 360/25 |
| 4,796,113 A | * 1/1989 | Hayakawa | 360/48 |
| 4,903,198 A | * 2/1990 | Iwasaki | 360/47 |
| 6,009,537 A | * 12/1999 | Tanimoto et al. | 360/77.05 |
| 6,032,276 A | * 2/2000 | Tomishima | 369/47.44 |
| 6,101,619 A | * 8/2000 | Shin | 714/42 |
| 6,189,110 B1 | * 2/2001 | Saitoh et al. | 714/710 |
| 6,332,207 B1 | * 12/2001 | Southerland et al. | 714/758 |

* cited by examiner

Primary Examiner—Robert Beausoliel
Assistant Examiner—Marc Duncan
(74) Attorney, Agent, or Firm—Lisa K. Jorgenson; William J. Kubida

(57) ABSTRACT

A method, apparatus, computer implemented method and computer programmed product for recovering data from a split sector associated with an inoperable servo timing mark. Instead of using a servo timing mark to synchronize the read/write head to the spin speed variation of a storage media, the trailing end of the data fragment preceding the inoperable servo timing mark is used as a reference point. After detecting the reference point, the read operation is halted a predetermined delay time after which the read operation is resumed recovering the data from the sector relying on the inoperable servo timing mark.

27 Claims, 7 Drawing Sheets

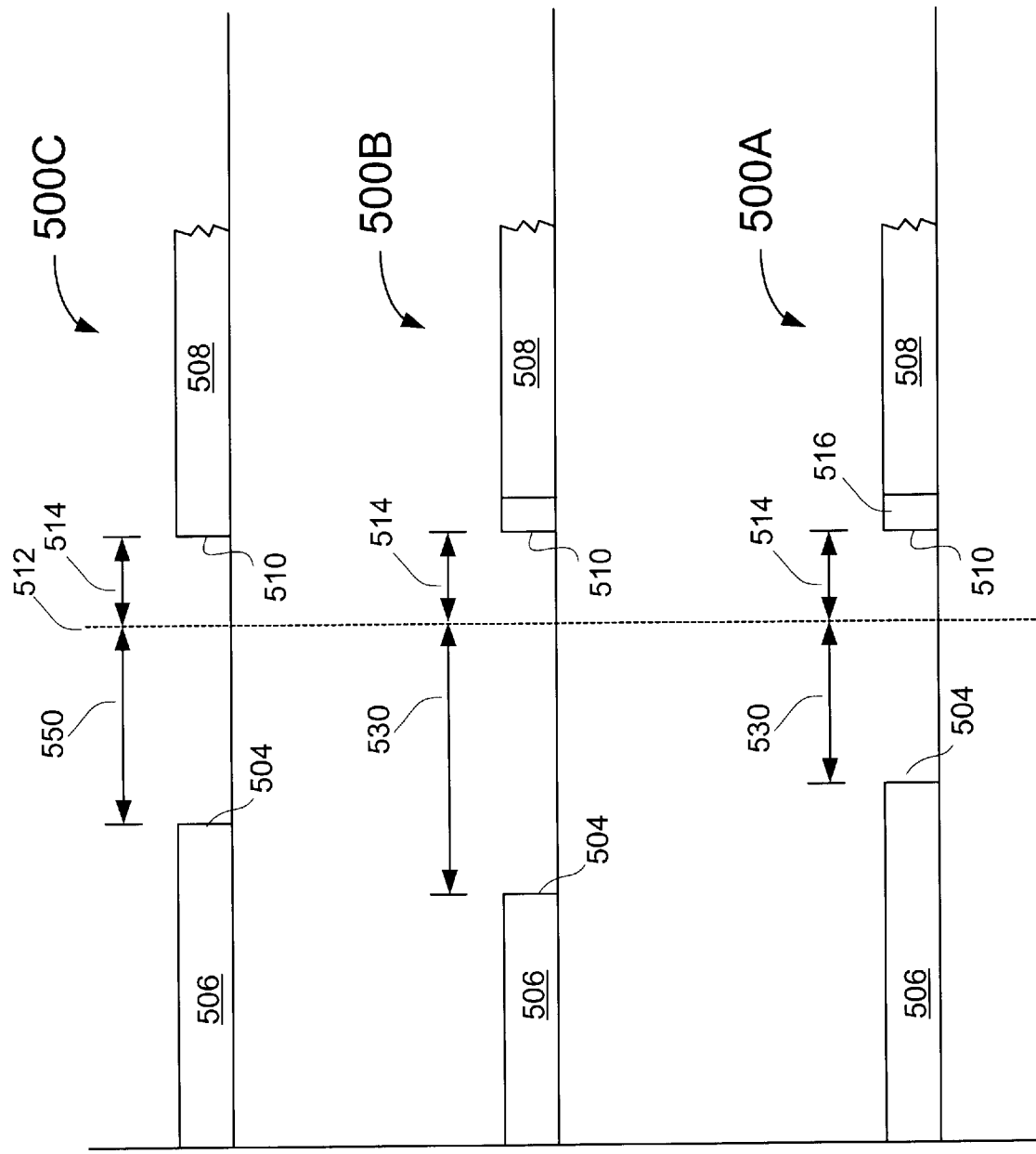

DISK DRIVE ERROR RECOVERY AND DEFECT MANAGEMENT METHOD

BACKGROUND OF THE INVENTION

A. Field of the Invention

The present invention relates in general to data storage devices and, more particularly, to an apparatus, method, computer implemented method and computer programmed product for recovering data from a storage media.

B. Background of the Invention

Computers store data in various storage media often referred to as "memory." Memory may be implemented in, for example, hard disk, floppy disk, compact disk read only memory (CD-ROM), random access memory (RAM), one or more levels of cache devices and other available data storage media. Some storage media is circular or disk shaped. One example of a disk shaped storage media is the floppy disk. Data on a floppy disk is typically stored in circular tracks on the disk surface. Within a track, data is stored in "sectors." A sector represents the smallest addressable block of data. The amount of data recorded on a track is typically chosen based on the maximum linear bit density that can be supported by the head and media combination.

Data is read off the disk by a read/write head. The head is positioned at the start of the data sector by a servo positioning system. A typical servo positioning system comprises an actuator, a head, and a control processor. The actuator moves the head radially across the surface of the disk as the disk spins under the head so that the head is placed at the start of the sector where the desired data is located. The control processor handles various control functions including driving the actuator and enabling the head during read and write operations.

To facilitate reading and writing data to the disk, each track, in addition to user data, also contains position information. Position information is provided, in some systems, by "servo position fields". Servo position fields provide reference both rotationally and radially for the read/write head relative to the disk surface. Servo position fields are typically placed at regular intervals along each track so that the disk drive's servo positioning system can make adjustments to the actuator position and spin speed as needed. The interval chosen for placement of the servo position fields on the disk is a function of the required actuator and spin speed stability.

Spin speed stability refers to variation in the spin speed of the disk in operation caused by variations in components and operating conditions. Drive manufacturers design a disk drive to have a maximum spin speed and a minimum spin speed when the drive is operated within specified environmental and operational ranges. Therefore, it is advantageous to use each servo position field's actual detected location to synchronize the reading and writing of user data to the rotational position of the media. The relationship between the optimum linear bit density and optimum position feedback interval, however, is such that data sectors do not always fit evenly between servo position fields. When this occurs the data sectors are "split," with one or more portions of the data or "data fragments" placed on each side of a servo position field. The data sector may be split anywhere depending on the location of the servo position field.

Disk drive media often contain defective areas. Reading and writing data to a defective area is at best unreliable and often impossible. A given size media defect becomes more apparent and affects more data as data is recorded more densely. To improve data storage on disks that contain defective areas, systems have been created to avoid recording data to defective areas. Moreover, defect management schemes have been an essential facilitating component for the increase in disk drive capacity that has been occurring for many years.

Over the years, the function of avoiding defective areas has migrated from the host computer and operating system to the disk drive itself. Operating systems no longer rely on intimate knowledge of such features as drive geometry, block ordering, skewing, and defect management techniques employed. Removing this knowledge from the operating system allows disk drive vendors to optimize these features for a specific product. These features are now implemented by a combination of firmware and hardware on the disk drive printed circuit board assembly.

Disk drive vendors implement a variety of defect management techniques to avoid using defective areas on a disk. One method involves locating all media defects and creating defect lists that describe the locations. Initially, defect locations are identified during manufacture and defect lists are stored in the drive before the drive is integrated into a computer system. However, many times new defects, often called "latent defects", become apparent after the disk drive is put to use. Some of the factors that may contribute to latent defects include undesirable head/media contact, an incomplete defect scan during the factory test process, and contamination, the latter being of particular concern on removable media type products such as the floppy disk.

Some disk drives are designed to automatically detect these new defects during user operation and automatically begin avoiding these locations. This feature is referred to as "automatic reallocation." Automatic reallocation can be performed when defects are detected during either a write operation or a read operation. In either case, reallocation involves halting the data transfer, selecting a new location for the data from a pool of spare locations, creating an association between the defective location and the new location (e.g. in a defect list), and resuming the data transfer. When the defect is discovered on a write operation, the data to be written is already available so the data transfer is resumed by redirecting the write operation to the new location. When the defect is discovered on a read, however, the data must be recovered, if possible, from the defective location and transferred to the new location before data transfer can resume.

When a new defect is discovered on a read operation it is often impossible in current systems to recover the data stored at the defective location. When the data is unrecoverable, disk drive vendors typically choose to not perform the reallocation. Rather, the data transfer is halted and an error is reported to the host computer. Such errors result in catastrophic data loss. If reallocation were to be attempted without recovering the correct data, the reallocated sector does not contain accurate data. Hence, any future read accesses to the defective sector must be flagged so that a data error is reported to the host computer. The data error must be reported until new data is written to the reallocated sector. Anytime data may be incorrect the disk drive must be able to notify the host computer or the bad data will be transferred. This complicates the disk firmware without recovering the data. In addition, future read accesses must not perform subsequent reallocations (until correct data is written) else the spare pool of data sectors may be consumed during repeated attempts by the host computer to read the data. Hence, a need exists for an improved method and mechanism for error recovery and defect management.

SUMMARY OF THE INVENTION

Briefly stated, the present invention involves a method, a computer implemented method, a computer program product and an apparatus for recovering data stored on a storage media where the data is stored in data fragments or sectors. Each data fragment is associated with a servo timing mark that may become inoperable. The present invention enables recovery of data stored in data fragments associated with an inoperable servo timing mark.

When an inoperable servo timing mark is detected on a read operation, the present invention transfers from normal read operation to an open loop mode. In the open loop mode the data associated with inoperable servo timing mark is recovered without using the servo timing mark associated with the data. Once the data is recovered it is reallocated to a new location in the storage media.

Open loop operation comprises detecting a time point relative to an operable servo timing mark preceding the inoperable servo timing mark. The relative time point may be any known time point including the end of the preceding data fragment or the preceding operable servo timing mark itself. A "known" time point means a time point that is known relative to an operable servo timing mark. A delay time is selected based on potential locations of the data fragment relative to the known time point. Preferably the delay time is fetched from a look-up table, however, the delay time may be obtained through alternative means such as a mathematical function. Once the delay time is determined, a read operation is attempted at a second time point occurring at the selected delay after the first time point. When the data is recovered it is reallocated to a different sector of the storage media.

The foregoing and other features, utilities and advantages of the invention will be apparent from the following more particular description of a preferred embodiment of the invention as illustrated in the accompanying drawings, or may be learned by practice of the invention. The advantages and purpose of the invention will be realized and attained by means of the elements and combinations particularly pointed out in the appended claims.

BRIEF DESCRIPTION OF THE DRAWINGS

FIG. 5A and FIG. 5B are representations of the relative timing characteristics of a disk drive error recovery and defect management method in accordance with the present invention.

DESCRIPTION OF A PREFERRED EMBODIMENT

The present invention involves a method, computer implemented method, apparatus and computer program product that recovers data from a defective sector(s) of a storage media associated with an inoperable servo timing mark. As previously discussed, it is advantageous to use a servo position field's detected location as a timing reference to synchronize reading and writing data to the rotational position of the disk. However, a media defect may render a given servo position field unreadable thereby losing the timing reference. Before the present invention, once the timing reference is lost, the sector or sectors that rely on the servo position field as a timing reference are not usable and must be considered defective as well.

When an inoperable servo timing mark is discovered during a write operation, the system is able to use automatic reallocation because the data is readily available. However, when an inoperable servo timing mark is detected on a read operation, current systems are typically not able to recover the data, due to the timing error introduced. The type of error reported is typically a "data synchronization error," meaning that the circuitry was unable to establish synchronization with the data on the disk. The data, under current systems, is unrecoverable and therefore cannot be reallocated without the complications discussed earlier.

Figure 1:
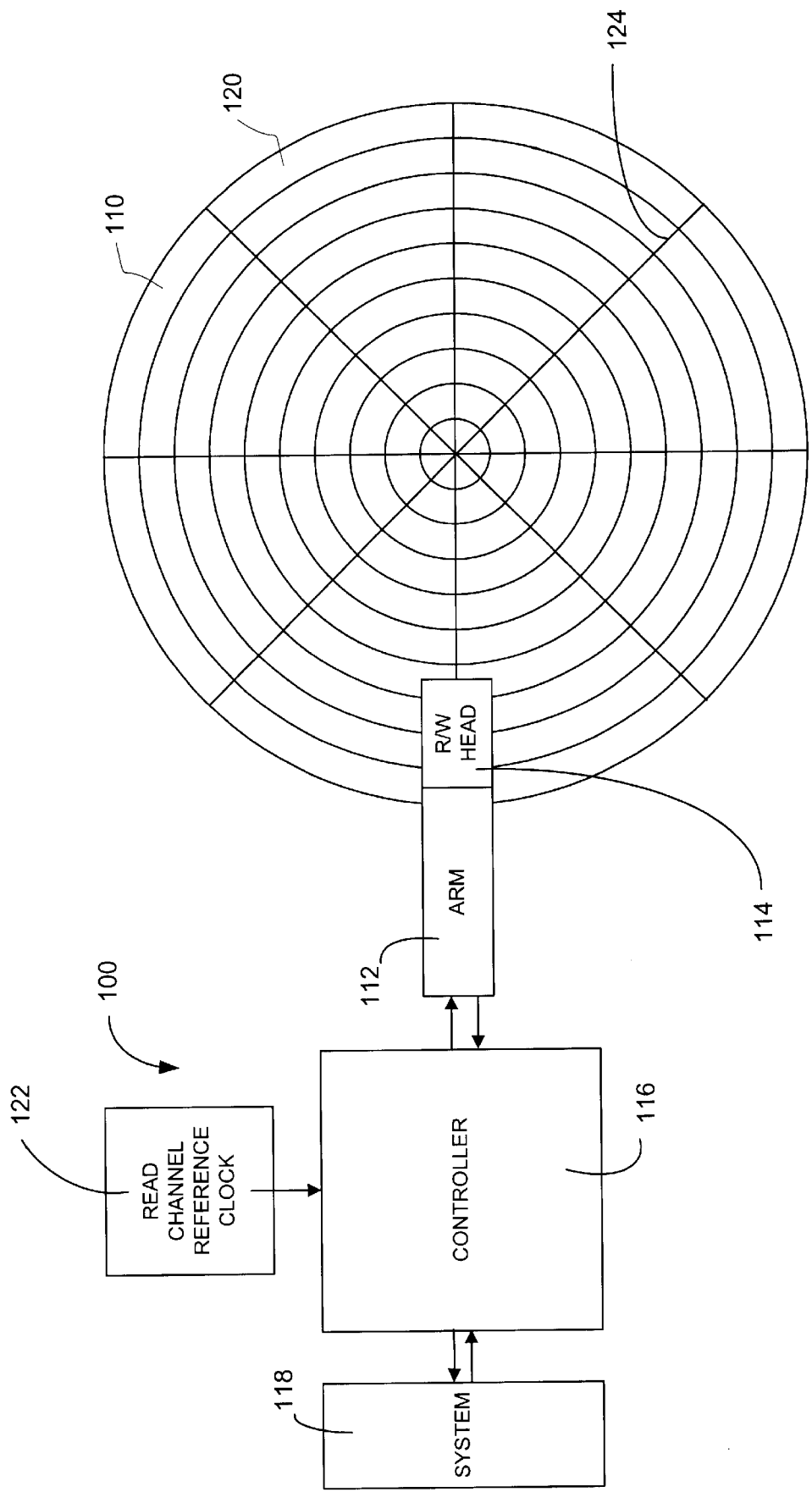
FIG. 1 is a simplified representation of a disk drive and associated hardware forming a portion of the operational environment of the present invention.

FIG. 1 shows components of a disk drive system in accordance with the present invention. The disk drive system comprises a storage media 110 and a servo positioning system 100. The servo positioning system comprises an arm 112, a read/write head 114 and a controller 116. Servo motors (not shown) respond to commands and/or signals from controller 116 to position arm 112 and head 114 at appropriate positions with respect to disk 110. The controller 116 receives instructions from various elements of the system 118 to read data from disk 110 or write data to disk 110. In the embodiment shown in FIG. 1 servo positioning system 100 has a dedicated controller 116. Control functions managed by controller 116, however, may be housed in other data processors well known in the art.

Figure 2:
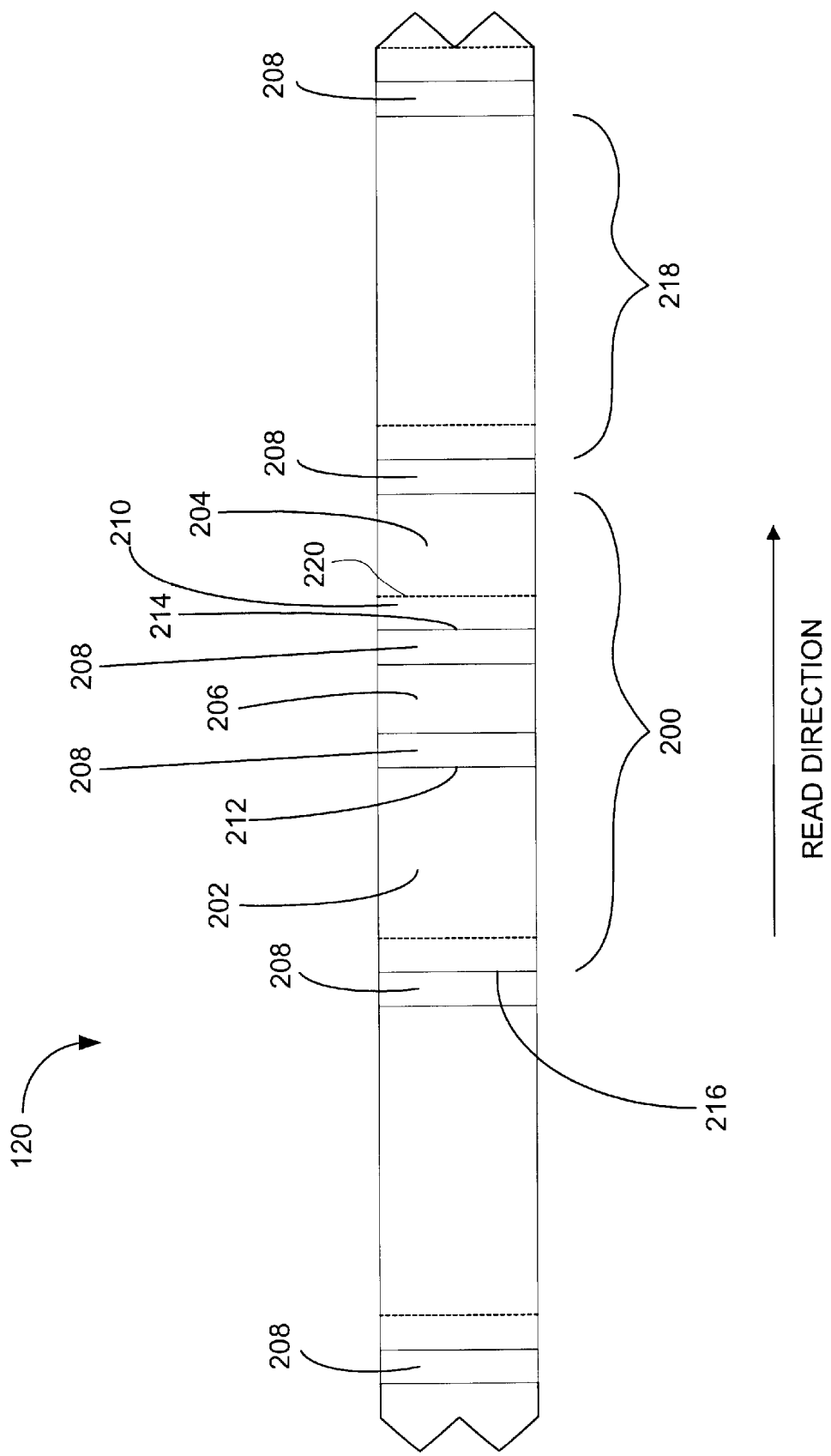
FIG. 2 is a schematic representation of a typical storage disk having tracks wherein the tracks are broken down into discrete storage sectors.

Data is stored on disk 110 in tracks 120. FIG. 2, is a more detailed view of discrete portion of track 120. In a split sector case, a data sector 200 is split with a first portion 202 and a second portion 204 on either side of a servo position field 206. Alternatively, all of sector 200 may reside on a single side of servo position field 206.

Upon receiving a read command controller 116 causes read/write head 114 to be placed at the start of the corresponding data sector 200. Disk 110 is then spun beneath head 114 and head 114 reads data on the underlying portion of disk 110. The data is then routed to the particular component in system 118 that requested the data. In the case of split sector 200, data is read as disk 110 spins beneath head 114 until controller 116 detects end 212 of data fragment 202. When end 212 of data fragment 202 is detected disk 110 continues to spin and controller 116 waits until servo position field 206 is detected. At this time, controller 116 resynchronizes the read operation to the media position to account for disk spin speed variations. The read operation is then resumed at beginning of data fragment 204 (indicated at 214 in FIG. 4).

Each sector 200 includes a "PLO field" that comprises is a constant frequency pattern that is detected by the read/write head and causes the PLO circuitry (not shown) to synchronize. The PLO field is written each time data is written to the segment. The read signal is asserted during the PLO field. If the read signal is asserted too soon, the PLO may receive noise or transients that interfere with the lock up process. If asserted too late, an insufficient number of PLO field bytes may be read to ensure lock up. The size of the PLO fields and the read assertion point are chosen with careful attention to the phase locked oscillator requirements and the uncertainty of the data position caused by spin speed variation.

When the read operation is resumed the read command is asserted over a phase locked oscillator field (PLO field) 210. Information from PLO field 210 is coupled to a phase locked oscillator (not shown) within controller 116. The PLO field information reflects the actual spin speed that existed when the PLO field was written and so allows PLO circuitry to automatically compensates for spin speed variations that may have affected the precise position of the data bits during recording and read back. After detecting PLO field 210 the read/write head 114 waits to read a sync byte 220. Sync byte 220 comprises a single byte of information located immediately after the PLO field 210 that indicates the beginning of the data. Once sync byte 220 is detected, the data following sync byte 220 is read.

Because of spin speed variation, gaps 208 are placed between sectors. The gap size is designed to accommodate a range of spin speed variations so that data sectors will not overlap at either extreme of the range of possible spin speed variations. With any spin speed variation, the farther away from a servo position field 206 that the read/write head 114 is placed the more uncertainty there is in the head and media's position. Accordingly, gaps 208 must be progressively larger as the distance from the timing reference to gap 208 increases. For this reason, it is advantageous to resynchronize the reading and writing of data with the servo position feedback at each servo position field 206.

When the servo position field 206 is undetected the read operation is unable to use the lost servo position field 206 to find the PLO field 210. Without the PLO field, the PLO circuitry cannot be synchronized to adjust for spin speed variation. Because the PLO circuitry is not synchronized, the data stored in the sector(s) 200 associated with the servo position field 206 cannot be read.

In accordance with the present invention, when an inoperable servo position field 206 is detected, the present invention identifies a "substitute" reference to a known location. In other words, a location with a known location with respect to an operable servo position field 206 is substituted for the location identified by the inoperable servo position field 206. Using this known location, the present invention estimates a location at which the PLO field 210 associated with the inoperable servo position field 206 will be found. Read/write head 114 is placed over the estimated location in an attempt to find PLO field 210 at the beginning of the desired data sector 200. Once PLO field 210 associated with the inoperable servo position field is found, the remaining data in the sector 200 can be read even though the associated servo position field 206 is in operable.

To accurately place the read/write head at the beginning of the data a known reference location is located. This substitute location differs from the "normal" position reference (i.e., the servo position field 206) in several respects. First, this substitute location is known with a higher than normal uncertainty because it may be referenced to a comparatively distant operable servo position field 206. Also, the substitute location is distanced from the PLO field 210 by a distance that is different than, for example, the separation between the inoperable servo position field 206 associated with PLO field 210.

To account for these differences, the range of possible spin speed variations is taken into account and a delay time is determined. The delay time is the amount of time after the known reference point in which the read operation is resumed. The delay time is determined to be a value that allows read operation to be enabled as the read/write head 114 is over PLO field 210. Hence, after the delay time the read operation is resumed at the beginning of the desired data sector 200 recovering the data that is normally unrecoverable under prior systems because of the inoperable servo timing mark 206.

Figure 3:
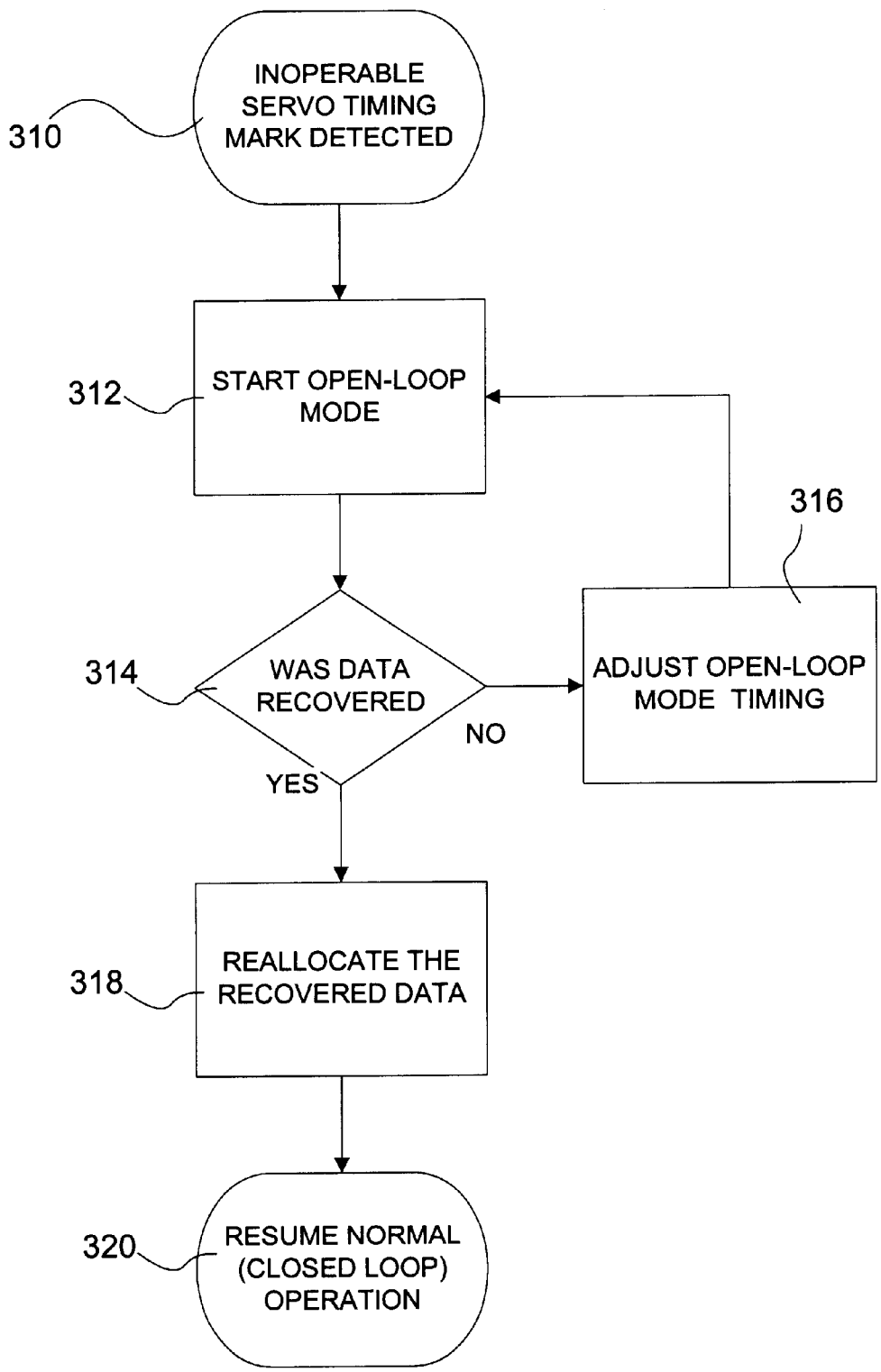
FIG. 3 is a flow diagram of a disk drive error recovery and defect management method.

FIG. 3 is a block diagram of a technique for recovering data when the servo timing mark 206 cannot be detected. During a read operation an inoperable servo timing mark 206 is detected at step 310. When this event occurs the controller 116 begins open loop mode operation at step 312. Open loop mode 312 is an operational mode not found in conventional systems. The objective of the open loop mode 312 is to recover the data stored in the sector 200 with the inoperable servo timing mark 206. As described hereinafter, open loop mode 312 may include several attempts to recover the data with incremental parametric variations (i.e., variation of the delay time) made between each attempt.

Controller 116 determines at step 314 if the data was successfully recovered during the open loop mode operation 312. If the data was not recovered controller 116 adjusts the open loop mode operation at step 316. Generally, the data is not recovered if the disk spin speed variation is so large that the read operation does not detect the start of the corresponding split sector (e.g. reference 210 of FIG. 2) during open loop mode operation 312. The processes of adjusting the open loop operation parameters and re-attempting open loop mode operation (i.e., steps 312 and 316) are repeated until the data is recovered. The recovered data is reallocated, at step 318, to a sector 200 with an operable servo position field 206 or no split at all. The controller 116 then resumes normal operation at step 320. Preferably, controller 116 will only repeat steps 312 and 316 a preselected number of times in order to avoid becoming stuck in an endless loop.

While the invention is illustrated in terms of a split sector implementation, it should be understood that the invention is readily extended to recover data whenever the servo timing mark cannot be detected.

Figure 4:
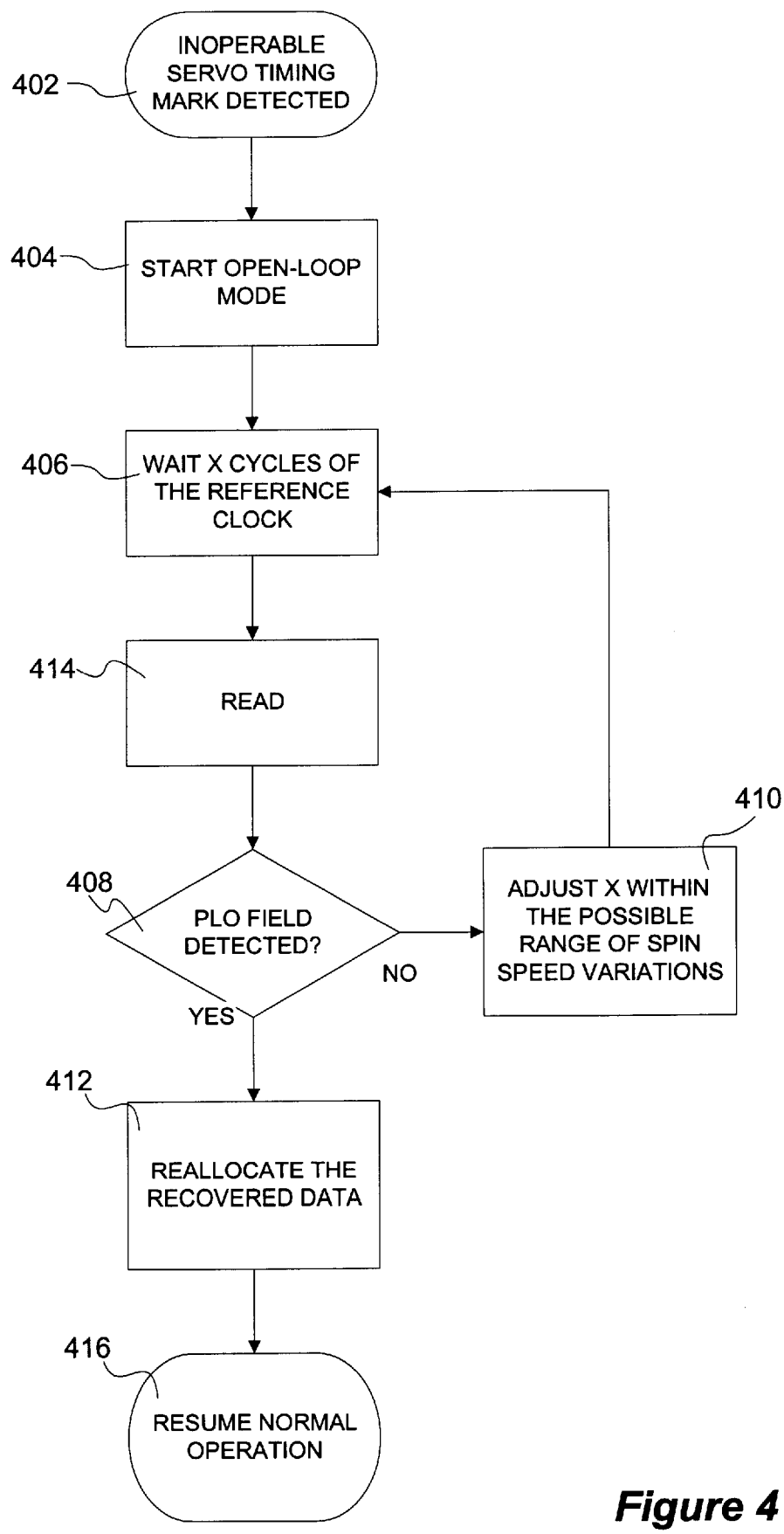
FIG. 4 is an flow diagram of the disk drive error recovery and defect management method shown in FIG. 3, showing additional detail of the open loop mode utilizing a reference clock.

Referring to FIG. 4, an inoperable servo timing mark is detected at step 402 and the open loop mode is begun at step 404. During open loop operation at step 406, controller 116 uses a reference clock (e.g. FIG. 1, reference number 122) to wait a predetermined number of cycles to resume the read operation 414. Referring to FIG. 2, the reference point to begin counting cycles of the reference clock 122 in the preferred embodiment is the end of the first portion 202 of the split sector 200, indicated generally at location 212. This reference location 212 is chosen to reduce the effect of spin speed variation on the resumption of the read operation. Other reference locations could be used, however, and the spin speed variation taken into account accordingly. For example, the previous operable servo timing mark (not shown in FIG. 2) or the beginning of the first portion of the split sector 200 (indicated at location 216) are equivalent substitutes for the preferred reference location.

Reference clock 122 used in step 406 is implemented using any available clock in the system. In the preferred embodiment, the read channel reference clock 122 is utilized. The read channel reference clock 122 is a reference for the disk control circuitry 116 during read operations. Because most systems already implement a read channel reference clock, or the equivalent, it is a convenient clock to use. After a predetermined number of cycles of reference clock 122 occur the read operation is resumed at step 414.

In the preferred embodiment, the controller determines if an adequate PLO field is detected at step 408 when the read operation 414 is resumed. Step 408 is deemed adequate when the detected portion of PLO field 210 contains a sufficient length to enable the PLO circuitry to lock. Once the PLO circuitry is locked, the read operation can proceed in a substantially conventional manner such that when the sync byte is detected the data from the following sector can be read.

If an adequate PLO field length is not detected the predetermined number of cycles to be used in the wait cycle 406 is modified at step 410 as a function of the range of possible spin speed variations of the disk. The read operation is then reattempted using the modified timing value (i.e. steps 406 and 414). This operation is continued until the data is successfully read or until controller 116 quits attempting to the read the data due to a time out or other user defined abort criteria. When the data is read, it is reallocated at step 412 in a substantially conventional manner to a functional sector and normal operation is resumed at step 416.

Figure 5B:
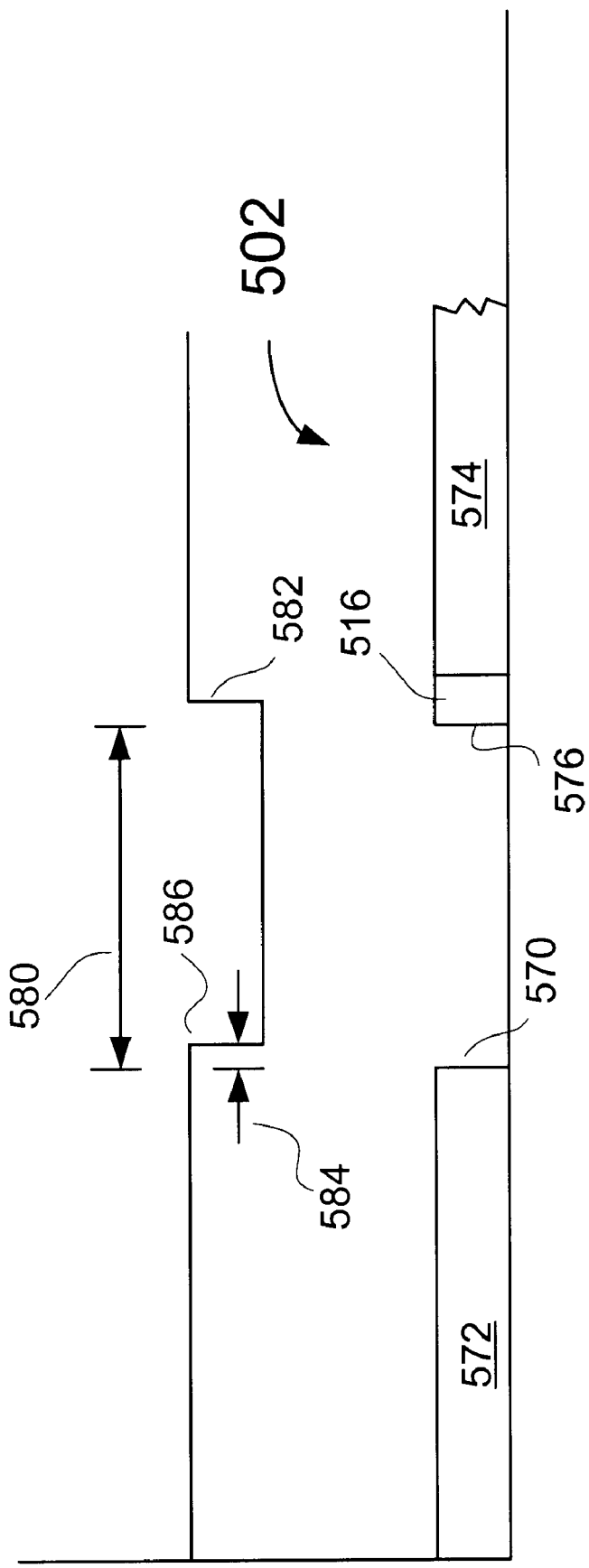

FIG. 5A illustrates the effect of spin speed variation in the operation in accordance with the present invention. FIG. 5A shows a split data sector comprising a first portion 506, ending at location 504, and a second portion 508 beginning at location 510. Dashed line 512 in FIG. 5A indicates a location for a servo position field which may be inoperable in accordance with the present invention. Portions 506 and 508 are separated by a distance between locations 504 and 510 of varying length in each instance. FIG. 5A shows three separate instances corresponding to three different spin speed variation cases. The timing diagrams in FIG. 5A and FIG. 5B illustrate how the relative distances between fields vary at differing timing scenarios. Timing diagram 500a shows a nominal spin speed variation. Timing diagram 500b shows a minimum spin speed case and timing graph 500c represents the maximum spin speed case. For reference, FIG. 5B includes timing diagram 502 that illustrates the delay timing of the read operation without an operable servo timing mark (timing graph 502).

Referring to timing diagram 500a (representing nominal spin speed variation), because of spin speed variation the actual position of location 504 is known only within a range of uncertainty. This uncertainty accumulates and becomes larger as the distance from a servo position field increases. To limit noise and transients on the read channel the read signal is de-asserted while read/write head 114 is over the media portion between location 504 and location 510. As the distance from a servo timing mark 506 increases the accumulated uncertainty increases to a point that conventional control circuitry can no longer determine when to reassert read/write head 114. Before this limit is reached, conventional systems required that a new servo position field 206 be detected at or about the location defined by dashed line 512.

The uncertainty caused by spin speed variations is illustrated by the difference in length between spans 510, 530 and 550. Span 510 represents the distance between location 504 to the servo timing mark 512. Depending on the spin speed variation at the time the data was written, the distance 510 may be large or small. When the spin speed is at its minimum during the write operation the distance 530 will be relatively large because the data is comparatively earlier on the media. However, when the spin speed is at its maximum when the data is written to the media the distance 550 will be small because the data is placed comparatively later on the media. The distance 514 between the servo timing mark 512 and location 510 has less variation due to the close proximity of the servo timing mark 512. As these graphs show, the distance (510–514, 530–514, and 550–514) between the end 504 of the first portion of the split sector 506 and the beginning 510 of the second portion 508 of the split sector varies considerably depending on spin speed variations. Locating location 510 is typically solved by re-synchronizing when the servo timing mark 512 is detected. After resynchronization the read/write head may be easily asserted over the PLO field 516 at the beginning of data fragment 508.

In the case of an inoperable servo timing mark, illustrated in timing diagram 502, the read/write head 114 cannot be resynchronized. Instead, location 570 of the first portion 572 is used as a substitute for the inoperable servo timing mark. Location 570 is an example of a location that is known with respect to a prior operable servo timing field (not shown). When read/write head 114 passes over location 570, a read enable signal 578 is de-asserted for a predetermined delay time 580 before being reasserted at time 582. Read/write head 114 is enable to perform a read operation when the read enable signal (illustrated as the upper signal line in FIG. 5B) is asserted. Delay 580 is selected to place read/write head 114 over a beginning location 576 of the second portion 574.

As discussed in reference to timing graphs 500a, 500b, and 500c, the range of possible distances (510–514, 530–514, 550–514) between the first portion 572 and the second portion 574 varies significantly within the manufacturing tolerances allowed by the drive designer and this variation is taken into account when determining the delay time 580. In addition, in practical circuit there are other delays, such as delay 584 between the detection of location 570 and location 586 where the read enable signal is actually de-asserted. These other delays and the variation of those delays within manufacturing tolerances should also be taken into account when determining the delay time 580.

Figure 6:
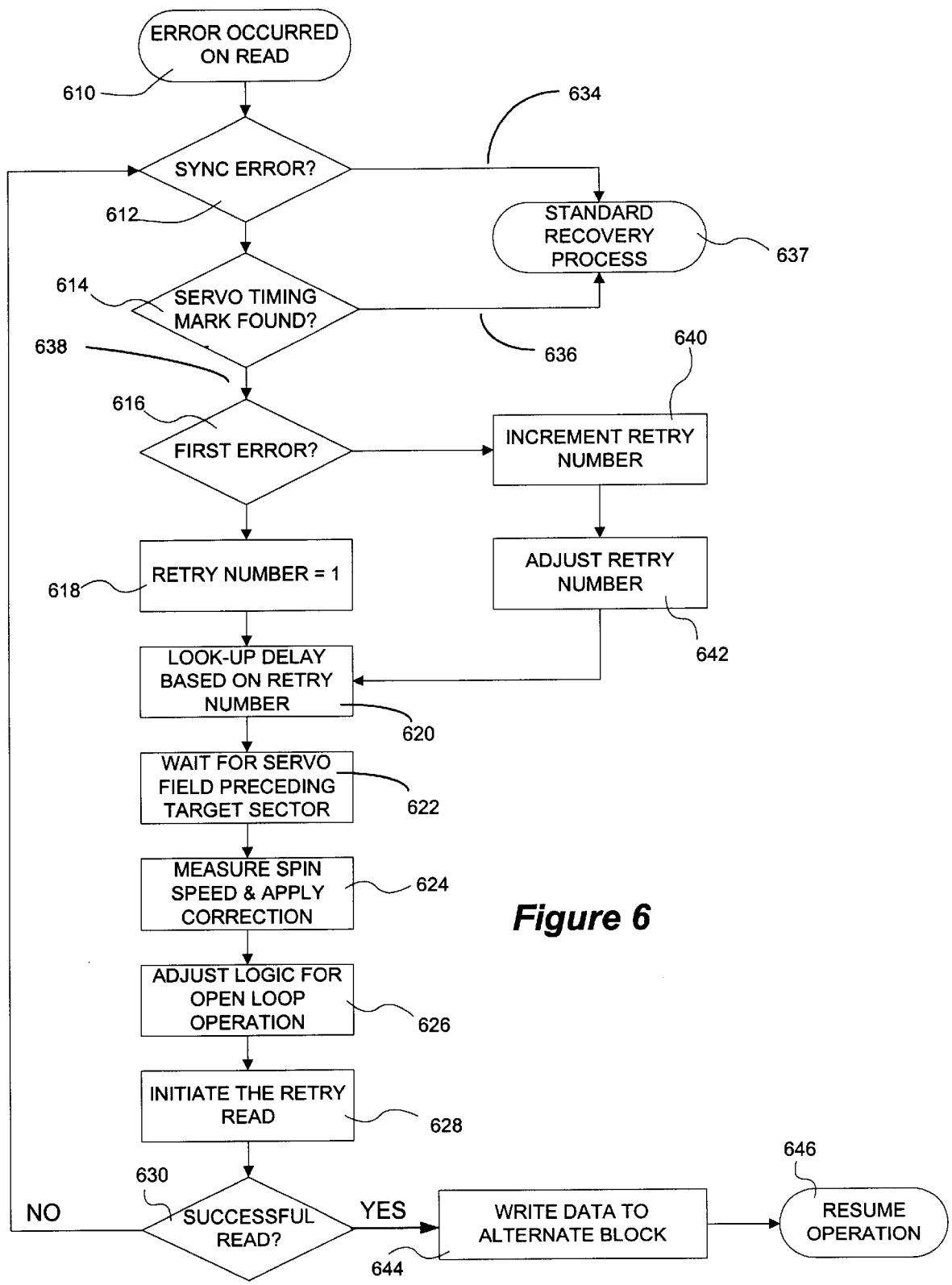
FIG. 6 is an additional block diagram of the disk drive error recovery and defect management method shown in FIG. 3, showing additional detail of the entire method.

FIG. 6 is a block diagram further describing the present invention using a look-up table to determine delay time 580. A correction block 624 adjusts the delay time 580 to account for the current spin speed variation. In operation, when an error occurs during a read operation at step 610, some disk control systems subsequently report a data synchronization error at step 612. At step 614, when a data synchronization error is reported the controller 116 determines when the error was the result of an inoperable servo timing mark. If the error that occurred on the read operation was not a data synchronization error 634 or the servo timing mark is found 636, the data may be reallocated at step 637 using methods well known in the art. However, if the servo timing mark is inoperable operation in accordance with the present invention passes via 638 to step 616 to recover the data from the defective sector.

Step 616 determines whether this is the first occurrence of a particular servo timing mark being inoperable. At step 618, when a servo timing mark is determined to be inoperable for the first time, the controller 116 sets a retry counter to an initial value such as "1". The retry counter value of 1 indicates that this is the first attempt to recover the data in the defective sector. At step 620, with the retry counter value set to 1, controller 116 looks up a delay value in a corresponding retry table 701 (shown in Table 1 below). The retry table used in step 620 may be physically implemented as a data structure in a protected area of disk 110, a RAM or ROM device, or any available memory device. Determining delay times for a retry table is discussed below.

The delay value represents a number of clock cycles the controller 116 will wait until attempting to read the data (i.e., reassert the read enable signal). The delay value corresponding to retry number 1 is desirably selected to have a high probability of recovering data on the first attempt. The delay takes into account the full range of possible disk spin speed variations and the range of possible locations that the data may be placed on the media given the spin speed variation present when the data was written. Subsequent delay values and corresponding retry numbers comprise a set of values representing the range of possible distances between the trailing edge 570 of the fragment 572 and the leading edge 576 of the fragment 574.

One way to determine this set of delay values, is to determine the maximum spin speed variation. Referring again to FIG. 5B, given the maximum spin speed variation, determine the maximum distance 580 that may separate the split sector portions (572, 574). The maximum distance 580 occurs when the first data fragment 572 is written at the minimum spin speed placing the data as early as possible on the media and the corresponding second data fragment 574 is written at the maximum spin speed placing the data as late as possible on the media. The minimum distance 580 occurs when the first data fragment 572 is written at the maximum spin speed placing the data as late as possible on the media and the second data fragment 574 is written at the minimum spin speed placing the data as early as possible on the media. Since different values of the delay 580, uncorrected for current spin speed, are not equal in their probability of recovering the data, it may be advantageous to select values of the delay starting with the center of the possible range and working out on subsequent retries. This will likely reduce the number of retries required to recover the data. A generalized example calculation is as follows:

Input data assumptions:

Servo timing mark to servo timing mark: 100 $\mu$S nominal

Spin tolerance: 0.002 (0.2%)

Servo field time: 10 $\mu$S nominal

Servo timing mark is centered in servo field

Maximum spin speed case:

the area available for data recording begins 4.99 $\mu$S after servo timing mark and ends 94.81 $\mu$S after servo timing mark the servo timing marks are 99.8 microseconds apart Minimum spin speed case:

the area available for data recording begins 5.01 $\mu$S after servo timing mark and ends 95.19 $\mu$S after servo timing mark the servo timing marks are 100.2 microseconds apart Therefore, the system is designed to record data in the range of 5.01 to 94.81 microseconds after a servo timing mark.

Referring again to FIG. 2, the maximum delay case, uncorrected for current spin speed:

data fragment 202 written at minimum spin speed, leaving a nominal gap of .19 $\mu$S between the trailing edge of the data 212 and the leading edge of the servo field 206 data fragment 204 written at maximum spin speed, leaving a nominal gap of 0.01 $\mu$S between the trailing edge of the servo field 206 and the leading edge 214 of the data fragment 204.

the nominal time period with no data recorded is then .19 $\mu$S+10 $\mu$S+0.01 $\mu$S=10.2 $\mu$S.

Minimum delay case, uncorrected for current spin speed:

data fragment 202 written at maximum spin speed, leaving no gap between the trailing edge 212 of the data and the leading edge of the servo field 206 data fragment 204 written at minimum spin speed, leaving no gap between the trailing edge of the servo field 206 and the leading edge 214 of the data 204.

the nominal time period with no data recorded is then 0 $\mu$S+10 $\mu$S+0 $\mu$S=10 $\mu$S.

Note that a specific design may preclude spin speed variations at opposite extremes on a given data split. The above example represents a worst case condition.

Knowing these limits, a retry table can be constructed listing a range of values in between these points at whatever resolution is desired, indexed by retry number. Table 1, below, illustrates a particular implementation of a retry table in accordance with the present invention.

TABLE 1

| Attempt | Delay Value |
| --- | --- |
| Retry 1: | 10.10 $\mu$S |
| Retry 2: | 10.08 $\mu$S |
| Retry 3: | 10.12 $\mu$S |
| Retry 4: | 10.06 $\mu$S |
| Retry 5: | 10.14 $\mu$S |
| Retry 6: | 10.04 $\mu$S |
| Retry 7: | 10.16 $\mu$S |
| Retry 8: | 10.02 $\mu$S |
| Retry 9: | 10.18 $\mu$S |
| Retry 10: | 10.00 $\mu$S |
| Retry 11: | 10.20 $\mu$S |

This table 1 lists possible delay values (10.00 $\mu$S–10.20 $\mu$S) in an order that begins with the most likely case (Retry 1=10.10 $\mu$S), to optimize the likelihood of recovery earlier in the retry sequence. Alternatively, the retry number values (10.10 $\mu$S–10.20 $\mu$S) could be generated mathematically in real time by implementing in code the steps outlined above to generate the table. However, in a typical disk drive firmware implementation a look-up table approach is both faster and more code space efficient. Furthermore, a table can contain units that are meaningful for the hardware implementation, for example, byte time units. A byte time unit is a method of measuring time in disk drive systems. A byte time unit is the amount of time required to write one byte of data to the storage media.

Preferably the retry factors shown in table above, are adjusted to account for any specific hardware latencies that are also affected by spin speed variations, such as the read path delay in the channel. For example, referring to FIG. 5B, if the channel has a delay of 0.2 microseconds delaying the location 586 at which the read signal is de-asserted by 0.2 $\mu$S with respect to location 570, the table entries would all contain 0.2 $\mu$S less than shown (Retry factor 1=10.10 $\mu$S becomes 9.9 $\mu$S).

Referring again to FIG. 6, after the delay value is fetched from a table in step 620 the controller 116 waits for the last servo field preceding the inoperable servo timing mark. After detecting the last operable servo position field at step 622, the current spin speed is measured at step 624. Using the measured spin speed a correction factor is calculated and applied to the retry factor fetched from the table in step 620. For example, if the control firmware is preparing for retry 4 (10.06 $\mu$S), and measures maximum spin speed (+0.2%), the actual delay value used would be 10.06 $\mu$S*0.998=10.04 $\mu$S. A given implementation may want to avoid step 624 or otherwise modify it based on the maximum amount the spin speed can change between two adjacent servo fields.

At step 626, the controller 116 is adjusted for open loop operation using the corrected delay value. Step 626 comprises the process of switching from normal operation (or closed loop operation) to open loop operation. This step is dependent primarily on a given disk drives control circuitry and code. After open loop operation is established at step 626, a read operation is attempted at step 628. if the data is not successfully recovered operation 630 returns control to step 612. At step 616, it will no longer be the first error and hence step 640 will increment the retry number (e.g. Retry 2=10.08 μS). In the event that there is an overflow in the retry table at step 642 (e.g. Retry 1 through 11 have been attempted) the retry numbers will be adjusted. After steps 640 and 642 are completed, steps 620 through 630 are repeated as described hereinbefore.

When data is recovered successfully at step 630 the data is reallocated at step 644 and normal operation is resumed at step 646. Step 644 comprises selecting an alternate sector, writing the data to this alternate sector, and recording both the defective sector location and the alternate sector location in a non-volatile memory area, typically a "defect list" stored in a reserved area of the disk itself. Future accesses to the block will note the relocation and transfer the alternate block instead of the defective block.

What is claimed is:

1. A computer implement method for recovering data stored on a storage media wherein the data is stored in a plurality of data locations with each data location associated with a servo timing mark, the method comprising:
   detecting an inoperable servo timing mark;
   in response to detecting the inoperable servo timing mark, reading data from a location associated with the inoperable timing mark in an open-loop mode without using the inoperable servo timing mark associated with the data; and
   reallocating the data to a new location in the storage media.

2. The computer implemented method of claim 1, wherein the step of reallocating the read data to a new location in the storage media comprises the steps of:
   selecting an alternate data location;
   recording the data location associated with the inoperable servo timing mark in a memory;
   recording the alternate data location in the memory; and
   reallocating the read data to the alternate location in the storage media.

3. A computer implemented method for recovering data stored on a storage media wherein the data is stored in a plurality of data locations with each data location associated with a servo timing mark, the method comprising:
   detecting an inoperable servo timing mark;
   in response to detecting the inoperable servo timing mark, reading data from a location associated with the inoperable timing mark in an open-loop mode, and
   reallocating the data to a new location in the storage media,
   wherein the step of reading data comprises:
      detecting a first location on the storage media, the first location having a known position relative to an operable servo timing mark preceding the inoperable servo timing mark;
      selecting a delay time based on potential locations of the data relative to the operable servo timing mark; and
      beginning the attempt to read at a second time point occurring at the selected delay after the first time point.

4. The computer implemented method of claim 3 wherein the storage media has a spin speed, further comprising the steps of:
   waiting until the servo timing mark of the data location preceding the inoperable servo timing mark;
   measuring the spin speed of the storage media; and
   applying a correction factor to the delay factor, wherein the correction factor is a function of the measured spin speed.

5. A method for recovering data stored on a storage media wherein the data is stored in a plurality of data locations with each data location associated with a servo timing mark that precedes the data location, the method comprising the steps of:
   providing for attempting to read an inoperable servo timing mark on the media;
   upon failing to read the inoperable servo timing mark, providing for reading data from a location following the inoperable timing mark in an open-loop mode without using the inoperable servo timing mark associated with the data; and
   providing for reallocating the read data to a new location in the storage media.

6. The method of claim 5, wherein the step of reallocating the read data to a new location in the storage media comprises:
   providing for selecting an alternate data location;
   providing for recording the data location associated with the inoperable servo timing mark in a memory;
   providing for recording the alternate data location in the memory; and
   providing for reallocating the read data to the alternate location.

7. A method for recovering data stored on a storage media wherein the data is stored in a plurality of data locations with each data location associated with a servo timing mark that precedes the data location, the method comprising the steps of:
   providing for attempting to read an inoperable servo timing mark on the media;
   upon failing to read the inoperable servo timing mark, providing for reading data from a location following the inoperable timing mark in an open-loop mode; and
   providing for reallocating the read data to a new location in the storage media;
   wherein the step of reading data comprises:
      providing for detecting a first time point relative to an operable servo timing mark preceding the inoperable servo timing mark;
      providing for selecting a delay time based on potential locations of the data relative to the operable servo timing mark; and
      providing for beginning the attempt to read at a second time point occurring at the selected delay after the first time point.

8. The method of claim 7 wherein a read channel control clock is used for timing the delay time.

9. The method of claim 7 wherein the delay time is obtained from a look-up table.

10. The method of claim 7 wherein the step of providing for beginning the attempt to read at a second time point comprises detecting if a PLO field adequate to allow phase locked oscillator lock up was read.

11. The method of claim 7 wherein the storage media has a varying spin speed, the delay time is a function of the spin speed variation.

12. The method of claim 7 wherein the storage media has a range of spin speeds between a maximum and a minimum, the delay time is function of the range.

13. The method of claim 7 wherein the storage media has a varying spin speed, comprising:
  providing for waiting until a servo timing mark preceding the inoperable servo timing mark;
  providing for measuring the spin speed of the storage media; and
  providing for applying a correction factor to the delay time, wherein the correction factor is a function of the measured spin speed.

14. A computer program product comprising:
  a computer useable medium having a computer readable code embodied therein for recovering data stored on a storage media wherein the data is stored in a plurality of data fragments with each data fragment associated with a servo timing mark that precedes the data fragment, the computer readable code comprising:
    computer readable program code devices configured to cause a computer to effect attempting to read an inoperable servo timing mark on the media;
    computer readable program code devices configured to cause a computer to effect reading data from a fragment following the inoperable timing mark in an open-loop mode upon failing to read the inoperable servo timing mark without using the inoperable servo timing mark associated with the data; and
    computer readable program code devices configured to cause a computer to effect reallocating the read data to a new location in the storage media.

15. A computer program product comprising:
  a computer useable medium having a computer readable code embodied therein for recovering data stored on a storage media wherein the data is stored in a plurality of data fragments with each data fragment associated with a servo timing mark that precedes the data fragment, the computer readable code comprising:
    computer readable program code devices configured to cause a computer to effect attempting to read an inoperable servo timing mark on the media;
    computer readable program code devices configured to cause a computer to effect reading data from a fragment following the inoperable timing mark in an open-loop mode upon failing to read the inoperable servo timing mark;
    computer readable program code devices configured to cause a computer to effect reallocating the read data to a new location in the storage media;
    computer readable program code devices configured to cause a computer to effect detecting a first time point relative to an operable servo timing mark preceding the inoperable servo timing mark;
    computer readable program code devices configured to cause a computer to effect selecting a delay time based on potential locations of the data fragment relative to the operable servo timing mark; and
    computer readable program code devices configured to cause a computer to effect beginning the attempt to read at a second time point occurring at the selected delay after the first time point.

16. The computer program product of claim 15 wherein the delay time is a set number of cycles of the read channel control clock.

17. The computer program product of claim 15 wherein the delay time is a preset delay factor from a lookup table.

18. The computer program product of claim 15 further comprising computer readable program code devices configured to cause a computer to effect detecting if a PLO field length adequate to allow PLO lockup was read.

19. The computer program product of claim 15 wherein the storage media has a spin speed, the delay time is a function of the spin speed variation of the storage media.

20. The computer program product of claim 15 wherein the delay time is a member of a set of possible retry factors found in a lookup table.

21. The computer program product of claim 15 wherein the delay time is a function of a minimum spin speed of the storage media and a function of a maximum spin speed of the media.

22. The computer program product of claim 20 wherein the retry factor set is a function of a minimum spin speed of the storage media and a function of a maximum spin speed of the media, wherein a first retry factor is the middle value of the range of values between the minimum and maximum spin speeds and subsequent values of the retry factor reciprocate outwardly from the middle of the range toward the maximum and minimum spin speed values so as to minimize the number of retries required to recover the data.

23. The computer program product of claim 15 wherein the storage media has a spin speed, further comprising:
  computer readable program code devices configured to cause a computer to effect waiting until a servo timing mark preceding the inoperable servo timing mark;
  computer readable program code devices configured to cause a computer to effect measuring the spin speed of the storage media; and
  computer readable program code devices configured to cause a computer to effect applying a correction factor to the delay time, wherein the correction factor is a function of the measured spin speed.

24. The computer program product of claim 15, wherein the computer readable program code devices configured to cause a computer to effect reallocating the read data to a new location in the storage media further comprises:
  computer readable program code devices configured to cause a computer to effect selecting an alternate location;
  computer readable program code devices configured to cause a computer to effect recording the data location associated with the inoperable servo timing mark in a memory;
  computer readable program code devices configured to cause a computer to effect recording the alternate sector location in memory; and
  providing for reallocating the read data to the alternate location in the storage media.

25. A method for recovering data stored on a storage media wherein the data is stored in a plurality of data fragments with each data fragment associated with a servo timing mark that precedes the data fragment, the method comprising the steps of:
  attempting to read an inoperable servo timing mark on the media;
  upon failing to read the inoperable servo timing mark, reading data from a fragment following the inoperable timing mark in an open-loop mode; and
  reallocating the read data to a new location in the storage media.

26. A method for recovering data stored on a storage media wherein he data is stored in a plurality of data fragments with each data fragment associated with a servo timing mark that precedes the data fragment, the method comprising the steps of:
  (a) detecting that a servo timing mark was not found;

(b) looking up a delay factor in a table;

(c) waiting for the servo timing mark in a data sector preceding the bad data sector;

(d) measuring the spin speed of the storage media and applying a correction value from the table to the delay factor, wherein the correction value is a function of the measured spin speed;

(e) attempting to read the data from the bad data sector;

(f) retrying steps c–e if data was not read in step e, wherein the delay factor is incremented by a factor stored in said table before proceeding to retry steps c–e; and (g) reallocating the read data to a new location in the storage media.

27. An apparatus for recovering data stored on a storage media wherein the data is stored in a plurality of data fragments with each data fragment associated with a servo timing mark that precedes the data fragment, the apparatus comprising:

a read/write head for attempting to read an inoperable servo timing mark on the media;

a control processor operably connected to said read/write head, said control processor programmed to operate in an open loop mode when an inoperable servo timing mark is detected, wherein said open loop mode recovers said data associated with said inoperable servo timing mark; and whereby, said control processor reallocates said recovered data to a new location is said storage media.

* * * * *